United States Patent
Karri et al.

(10) Patent No.: US 11,584,241 B2
(45) Date of Patent: Feb. 21, 2023

(54) ROUTING AND CHARGING OF ELECTRIC POWERTRAIN VEHICLE

(71) Applicant: International Business Machines Corporation, Armonk, NY (US)

(72) Inventors: Venkata Vara Prasad Karri, Visakhapatnam (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 155 days.

(21) Appl. No.: 17/029,108

(22) Filed: Sep. 23, 2020

(65) Prior Publication Data

US 2022/0089043 A1  Mar. 24, 2022

(51) Int. Cl.
*B60L 53/126* (2019.01)
*B60L 53/35* (2019.01)
*B60L 3/00* (2019.01)

(52) U.S. Cl.
CPC ........... *B60L 53/126* (2019.02); *B60L 3/0023* (2013.01); *B60L 3/0092* (2013.01); *B60L 53/35* (2019.02)

(58) Field of Classification Search
None
See application file for complete search history.

(56) References Cited

U.S. PATENT DOCUMENTS

| | | | |
|---|---|---|---|
| 9,779,365 B2 | 10/2017 | Smullin et al. | |
| 10,632,852 B2 | 4/2020 | Ricci | |
| 2010/0094496 A1* | 4/2010 | Hershkovitz | B60L 53/14 701/22 |
| 2017/0176195 A1* | 6/2017 | Rajagopalan | G01C 21/3415 |
| 2019/0193582 A1 | 6/2019 | Matsuoka et al. | |
| 2019/0205842 A1 | 7/2019 | Starns | |
| 2019/0315242 A1* | 10/2019 | Sponheimer | B60L 53/36 |
| 2019/0381902 A1 | 12/2019 | Apostolos et al. | |
| 2020/0376972 A1* | 12/2020 | Martin | H01M 10/44 |

OTHER PUBLICATIONS

"Future electric cars could recharge wirelessly while you drive: Charging plates in the road would send electrical energy to an onboard battery wirelessly." Science Daily, Mar. 27, 2018. <www.sciencedaily.com/releases/2018/03/180327094023.htm>.

(Continued)

*Primary Examiner* — David V Henze-Gongola
(74) *Attorney, Agent, or Firm* — Mark Bergner

(57) ABSTRACT

A request to move along a route is detected. The request is from a first electric vehicle. The route may include a start point and an end point. It may be determined that the first vehicle is an electric vehicle including a battery. In response to determining that the first vehicle is an electric vehicle, one or more battery parameters of the first vehicle may be retrieved. One or more electric vehicle chargers may be identified based on the start point and the end point. A subset of the electric vehicle chargers may be selected based on the battery parameters of the first vehicle. A second route is generated based on the subset of the electric vehicle chargers. The second route is generated such that the first vehicle is capable of reaching the end point. The route of the first vehicle may be replaced with the second route.

18 Claims, 6 Drawing Sheets

(56) References Cited

OTHER PUBLICATIONS

D. Boffey, World's first electrifiled road for charging vehicles opens in Sweden, The Guardian, 6 pages, Apr. 12, 2018, downloaded from the following website: https://www.theguardian.com/environment/2018/apr/12/worlds-first-electrified-road-for-charging-vehicles-opens-in-sweden.
Rayner, Tristan, "Turning Roads into Smart Charging Solutions for Electric Cars", Reset Digital for Good, 12 pages, found on the following website: https://en.reset.org/blog/turning-roads-smart-charging-solutions-electric-cars-07052018.
Klochikhin, Evgeny, Autonomous Vehicles and the Hidden Parking Problem: Where Will We Park Self-Driving Cars? 5 pages, Jan. 25, 2019, found at the following website.
Gardiner, J., "The rise of electric cars could leave us with a big battery waste problem", The Guardian, 2 pages, Aug. 10, 2017.
Mell, P. et al., "The NIST Definition of Cloud Computing", Recommendations of the National Institute of Standards and Technology, NIST Special Publication 800-145, 7 pages, Sep. 2011.

* cited by examiner

ROUTING AND CHARGING OF ELECTRIC POWERTRAIN VEHICLE

BACKGROUND

The present disclosure relates to vehicles, and more specifically, to providing charge to electric vehicles.

Vehicles may be used to transport people, and to facilitate movement of goods and services. Vehicles may operate based on a powertrain, such as an internal combustion engine. Vehicles may operate based on an electric powertrain, such as an electric motor. The electric motor may be powered by a battery, a generator, a hydrogen fuel cell, or other power source.

SUMMARY

According to embodiments, disclosed are a method, system, and computer program product.

A request to move along a route is detected. The request is from a first electric vehicle. The route may include a start point and an end point. It may be determined that the first vehicle is an electric vehicle including a battery. In response to determining that the first vehicle is an electric vehicle, one or more battery parameters of the first vehicle may be retrieved. One or more electric vehicle chargers may be identified based on the start point and the end point. A subset of the electric vehicle chargers may be selected based on the battery parameters of the first vehicle. A second route is generated based on the subset of the electric vehicle chargers. The second route is generated such that the first vehicle is capable of reaching the end point. The route of the first vehicle may be replaced with the second route.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
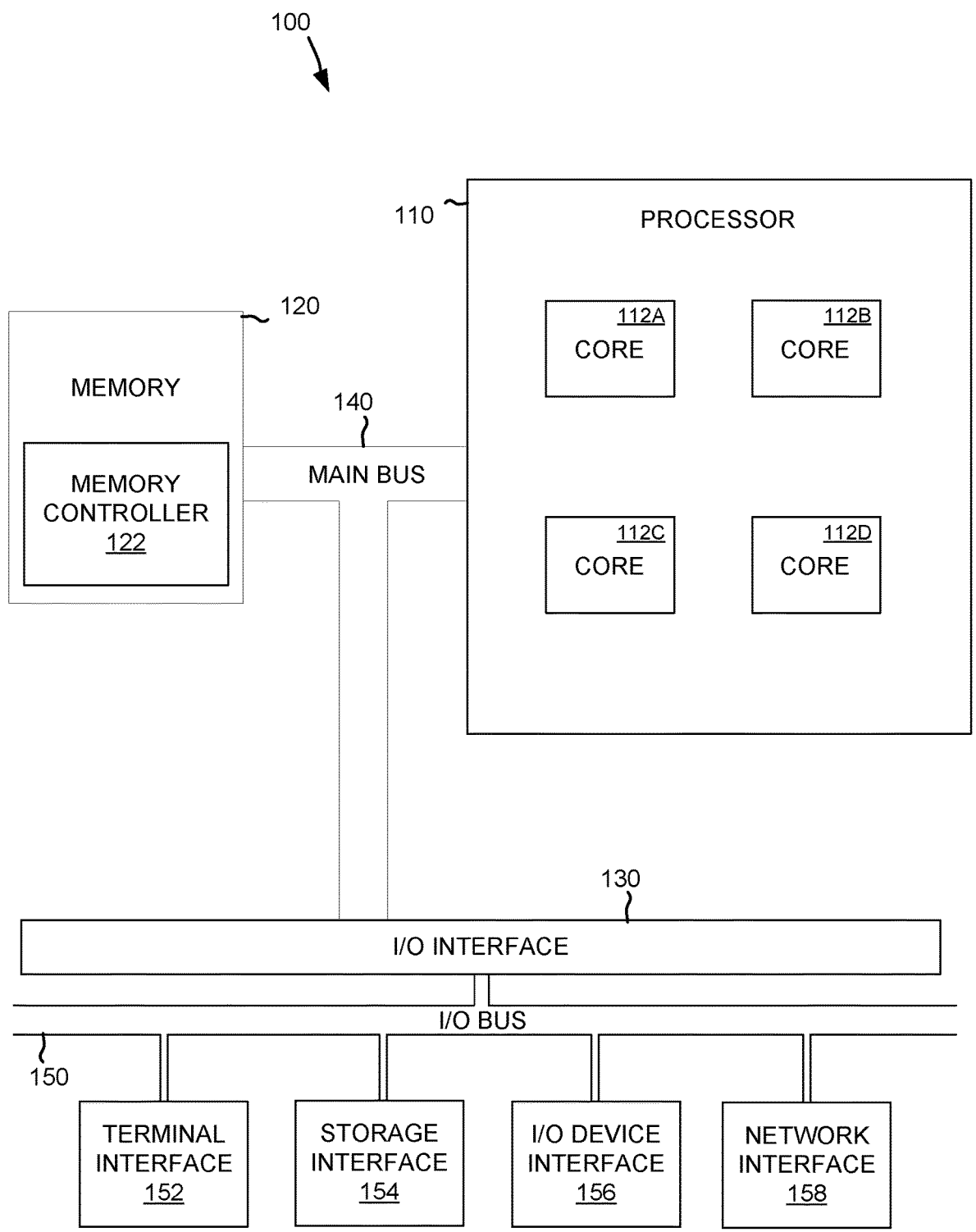
FIG. 1 depicts the representative major components of an example computer system that may be used, in accordance with some embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to vehicles; more particular aspects relate to providing charge to electric vehicles. While the present disclosure is not necessarily limited to such applications, various aspects of the disclosure may be appreciated through a discussion of various examples using this context.

Vehicles have become one of the predominant forms of travel throughout many locations of the world. Vehicles may include cars, trucks, vans, crossovers, station wagons, and other relevant configurations. A vehicle may be powered by a powertrain such as a gasoline internal combustion engine. Many parts of the world have infrastructure created to quickly refuel the internal combustion engine with gasoline. More recently, other forms of powertrains have become increasingly popular, such as electric powertrain vehicles (electric vehicles).

Electric vehicles may operate based on a power source such as a battery. The battery of an electric vehicle may take an extended period of time, e.g., hours, to perform a recharge. In some circumstances, an electric vehicle may take many hours or even days to provide a full recharge of a fully depleted battery.

Charging of electric vehicles may be performed by a variety of options. For example, electric vehicles may receive a charge by parking at a charging point and plugging into a wired charger. The charging point may provide a trickle charge; the trickle charge may be a charge that is a slow rate of charge that may provide only enough battery for a short trip or may take many hours for a longer trip. The charging point may provide for a high-speed charge, such as capable of charging a vehicle within an hour or less. In some circumstances, electric vehicles may be configured to receive an inductive charge. An electric vehicle may be configured to receive an inductive charge when the electric vehicle is located proximate to an inductive charger. For example, an electric vehicle may drive into a parking space or along an inductive roadway. While directly above the inductive parking space or roadway, the inductive charge may wirelessly provide a charge to the electric vehicle. In some circumstances, electric vehicles may be configured to provide a charge. For example, a first electric vehicle may be configured to provide wired or wireless charge to other electric vehicles.

Additionally, autonomous vehicles are becoming increasingly used in to navigate through the world. An autonomous vehicle may be a vehicle configured to move throughout an environment based on a computer and one or more sensors. For example, a first autonomous vehicle may include lidar, visible light cameras, or other sensors to observe and measure the environment. In another example, an autonomous vehicle may include relative position sensors, such as a global position sensor (GPS) or accelerometer. In yet another example, an autonomous vehicle may utilize a combination of sensors, such as GPS and cameras to determine position and navigate through the environment. Autonomous vehicles may be highly desirable for users—in some cases, a user may be permitted to stop actively participating in the act of driving and may, consequently, use autonomous vehicles more frequently or for more trips. For example, a user may ride in an autonomous vehicle to go get a beverage from a café that is a farther distance away, because the user does not need to actively drive an autonomous vehicle. In another example, a user that has vision impairment and is not legally able to drive, may be legally able to ride in an autonomous vehicle.

The features and benefits may lead to increased adoption of electric vehicles, autonomous vehicles, and autonomous electric vehicles (vehicles that are both electric and autonomous). There may be many issues that come about due to the increased adoption of electric vehicles. One drawback is that the infrastructure supporting electric vehicles is not as standardized as that of other vehicles. For example, while gasoline vehicles may have a strong and abundant set of fueling stations, electric charging stations are not as widespread. Further, not every electric vehicle has the same capabilities of charging infrastructure. For example, some electric vehicles may be configured to use a first type of electric charger, while other electric vehicles may only be configured to use a second type of electric charger. The lack of electric charging infrastructure and the non-standard nature of electric charger compatibility may lead to confusion and congestion in operating an electric vehicle. For example, users of electric vehicles may be subject to long lines waiting for an available electric charger. In another example, a user of a first electric vehicle may have to spend extraneous time and waste electricity searching and driving to locate and use an electric charger that is available and compatible with the first electric vehicle.

The rise of vehicle usage may further exacerbate the issues with electric vehicle charging. Specifically, vehicle usage may cause further congestion as the traffic may increase to many times the previous amount. Ride sharing services, autonomous vehicles, and the popularity of riding in a vehicle as opposed to taking a bus or a train, may lead to overcrowded roads. Further, autonomous vehicles may operate with greater precision than manually operated vehicles. The sensors and computing power of an autonomous vehicle may permit many autonomous vehicles to operate in a relatively small space. Further, autonomous vehicles may also be able to travel at a slower speed, as a user is not as concerned with the time it takes to ride in a vehicle if they are relieved of the duties of driving and piloting the vehicle through an environment. For example, four or five autonomous vehicles may have the precision and reaction time necessary to take up a similar space on a roadway as two or three user-driven vehicles.

Without coordination, electric vehicle charging can lead to congestion at chargers, long lines, and may, in some cases, create congestion in surrounding roadways for both electric vehicles and other vehicles that occupy the same roadways. These issues may also lead to delays for others. Specifically, as autonomous vehicles and electric vehicles leverage the same roads as human-driven autonomous and gasoline automobiles, there is systemic overhead of arranging and providing access to charging infrastructure to enable electric vehicles to reasonable navigate from a start point to an end point. In many ways, the process is isolated and uncoordinated.

Electricity aware vehicle navigation (EAVN) may overcome the many drawbacks associated with uncoordinated and overcrowded vehicle usage. The EAVN may operate to provide guidance and route planning such that electric vehicles are recharged in an effective manner. The EAVN may operate to provide a charge in a coordinated fashion. Specifically, an EAVN may observe and react to traffic conditions of other electric vehicles. Further, the EAVN may be configured to observe the flow of traffic generally through an environment, and to determine that various routes should be used to reduce the wait time, and the charge time. The EAVN may operate on a holistic level, to provide electric vehicles with access to charge points for the route they are trying to travel, and to ultimately reach an end point, while also prioritizing other vehicles that are also trying to reach other end points.

The EAVN may monitor the environment to determine a route that reduces the overall travel time while also reducing the overall charge time of charging points that are proximate to the route of electric vehicles. The EAVN may be configured to determine the various vehicle parameters of each electric vehicle and may coordinate operation of the collective electric vehicles based on these parameters. The EAVN may be configured to evaluate and suggest charging strategies based on a mode of charging with respect to different contextual situations, and will be identifying an effective mode of vehicle recharge. The EAVN may request, from an electric vehicle or by cross-reference to vehicle specifications, the various parameters. For example, the EAVN may operate by determining a recharge rate of an electric vehicle, a recharge compatibility of one or more electric vehicle chargers proximate to a route of the electric vehicle, a manner of recharge of the electric vehicle, and the age of one or more components of the electric vehicle. In some embodiments, the EAVN may operate in combination with specialized infrastructure, such as charging a first vehicle from a second vehicle, the relative position of the sensors in the first vehicle, the second vehicle, a roadway of travel, or in some combination.

The EAVN may operate continuously or periodically and may be configured to receive and process requests, and update routes, as various vehicles are operating. For example, an EAVN may be configured to receive a request for routing of a vehicle that is already on a roadway and is moving towards an end point. The EAVN may operate by interfacing with one or more vehicle systems, on-board computers, or low-level computer vehicular sensors and systems. For example, the EAVN may be configured to retrieve a current range of a first electric vehicle in response to receiving a request to find a place to charge.

The EAVN may be configured to operate responsive to a goal-based priority and based on the requests and range requirements of multiple electric vehicles. For example, the EAVN may, based on the required recharging timeline and amount of recharging of an autonomous vehicle, prioritize or reorder the charging of the electric vehicle in relation to other electric vehicles. The EAVN may be configured to coordinate with infrastructure. For example, while one or more electric vehicles are in a parking lot, the EAVN may instruct each to alternate, or take turns. Specifically, a first electric vehicle may be instructed by the EAVN to use a parking space with a charging point for a limited amount of time. The EAVN may then instruct the other vehicles to take a turn using the parking space. The EAVN may be configured to instruct each vehicle to alternate or move out of the parking space despite each of the vehicles receiving a lower amount of charge. For example, a first electric vehicle may only receive a partial charge and may not be fully charged, before a second electric vehicle is directed to use the charging point. Consequently, one or more, or all, of the electric vehicles may not receive a full recharge of the power source (e.g., battery). The instruction to alternate or only receive a partial charge may be based on the route, end point, or other factors. For example, each of the vehicles can recharge while they are on the parking lot, such that all or the majority of the electric vehicles may have enough range to reach their respective endpoints.

The EAVN may be configured to classify one or more of the vehicles by calculating comparative priority scores. The priority scores may take into account multiple factors of charging. The priority score may also take into account additional factors other than charging time. For example, the EAVN may classify each of a plurality of electric vehicles based on charge, and also based on likelihood of contributing to traffic congestion or delay in arriving because of battery recharging time or rate of discharge while running/on road.

The EAVN may be configured to update the guidance or routing of vehicles based on the electric vehicle parameters. The EAVN may also be configured to update the guidance or routing of vehicles based on congestion in an environment. For example, the EAVN may be configured to assign appropriate travel route of one or more electric vehicles. The reassigning of the route may take into consideration the time it takes to drive around or avoid certain infrastructure. The EAVN may reassign routes of vehicles based on usage of existing electric charging points. In some embodiments the EAVN may adjust other driving operations of one or more electric vehicles. For example, the EAVN may be configured to adjust the speed of a vehicle, to drive over or proximate to a smart road, considering the length of the smart road, traffic condition, etc., and accordingly, an appropriate route will be assigned to the vehicles.

The EAVN may be configured to update guidance and routing for use of charging infrastructure based on traffic conditions and various points during a route from a start point to an end point. For example, if the EAVN predicts one or more vehicles may be idle due to traffic, or because a user may typically make a stop somewhere, then one or more of the vehicles may be instructed to stop at a charging point or parking area adjacent to a recharging point and wait for the availability of the charging point.

The EAVN may be configured to rearrange the formation of vehicles as they travel along a road. Specifically, the EAVN may instruct a first electric vehicle to adjust its relative position in relation to other vehicles on the road. The instruction may reduce the amount of congestion or traffic, and to alleviate bottlenecks in the driving of multiple vehicles. For example, the EAVN may determine that the first vehicle may be stopping at a charging point that is on the right side of the road, and the vehicle is currently traveling along the road in the left lane. The EAVN may instruct a second vehicle that is currently in the right lane to switch places with the first vehicle. The instruction may be given by the EAVN some distance, e.g., miles, (or time, e.g., hours) before the location of the charging point. The early instruction may ensure that vehicles may quickly and efficiently arrive at a charging point without contributing to any traffic congestion or delay in arrival of the plurality of vehicles sharing the road.

In some embodiments, the EAVN may instruct multiple vehicles to coordinate movement and share energy. For example, a first electric vehicle may be configured to provide an electric charge to other electric vehicles through a port located on the right side of the first electric vehicle. The EAVN, based on determining the various parameters of the first electric vehicle, may instruct the first electric vehicle to position itself such that access is available to the port. For example, the EAVN may instruct the first electric vehicle to park in a spot on the left side of a parking lot, and consequently facilitate an open space adjacent to the right side (e.g., adjacent to the port). The EAVN may extract the route details and context beforehand for each vehicle in that route and thereby perform analysis on attributes of discharge rate, context, and vehicle type (battery size) to determine the idle recharge time/power required for each vehicle to reach its respective destination. The EAVN may further auto identify any other vehicle that is compatible or in full power to donate electricity required.

The EAVN may interface with an existing automotive system of a given vehicle. For example, the EAVN may intercept and modify an existing heads up display, navigation display, or other interface of a vehicle. In the case of human-driven vehicles, the updated display may intuitively communicate to the driver of a charging point for charging of the vehicle. The display may be presented as an augmented reality display. For example, the EAVN may render symbols and/or text (e.g., renderings) within a real-world environment. The renderings provided to the augmented display of a vehicle, by the EAVN, may be such that a user intuitively understands that a particular electronic charging spot, parking spot, lane of a road, or other vehicle will provide for charging.

FIG. 1 depicts the representative major components of an example computer system 100 (alternatively, computer) that may be used, in accordance with some embodiments of the present disclosure. It is appreciated that individual components may vary in complexity, number, type, and/or configuration. The particular examples disclosed are for example purposes only and are not necessarily the only such variations. The computer system 100 may include a processor 110, memory 120, an input/output interface (herein I/O or I/O interface) 130, and a main bus 140. The main bus 140 may provide communication pathways for the other components of the computer system 100. In some embodiments, the main bus 140 may connect to other components such as a specialized digital signal processor (not depicted).

The processor 110 of the computer system 100 may be comprised of one or more cores 112A, 112B, 112C, 112D (collectively 112). The processor 110 may additionally include one or more memory buffers or caches (not depicted) that provide temporary storage of instructions and data for the cores 112. The cores 112 may perform instructions on input provided from the caches or from the memory 120 and output the result to caches or the memory. The cores 112 may be comprised of one or more circuits configured to perform one or more methods consistent with embodiments of the present disclosure. In some embodiments, the computer system 100 may contain multiple processors 110. In some embodiments, the computer system 100 may be a single processor 110 with a singular core 112.

The memory 120 of the computer system 100 may include a memory controller 122.

In some embodiments, the memory 120 may include a random-access semiconductor memory, storage device, or storage medium (either volatile or non-volatile) for storing data and programs. In some embodiments, the memory may be in the form of modules (e.g., dual in-line memory modules). The memory controller 122 may communicate with the processor 110, facilitating storage and retrieval of information in the memory 120. The memory controller 122 may communicate with the I/O interface 130, facilitating storage and retrieval of input or output in the memory 120.

The I/O interface 130 may include an I/O bus 150, a terminal interface 152, a storage interface 154, an I/O device interface 156, and a network interface 158. The I/O interface 130 may connect the main bus 140 to the I/O bus 150. The I/O interface 130 may direct instructions and data from the processor 110 and memory 120 to the various interfaces of the I/O bus 150. The I/O interface 130 may also direct instructions and data from the various interfaces of the I/O bus 150 to the processor 110 and memory 120. The various interfaces may include the terminal interface 152, the storage interface 154, the I/O device interface 156, and the network interface 158. In some embodiments, the various interfaces may include a subset of the aforementioned interfaces (e.g., an embedded computer system in an industrial application may not include the terminal interface 152 and the storage interface 154).

Logic modules throughout the computer system 100—including but not limited to the memory 120, the processor 110, and the I/O interface 130—may communicate failures and changes to one or more components to a hypervisor or operating system (not depicted). The hypervisor or the operating system may allocate the various resources available in the computer system 100 and track the location of data in memory 120 and of processes assigned to various cores 112. In embodiments that combine or rearrange elements, aspects and capabilities of the logic modules may be combined or redistributed. These variations would be apparent to one skilled in the art.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
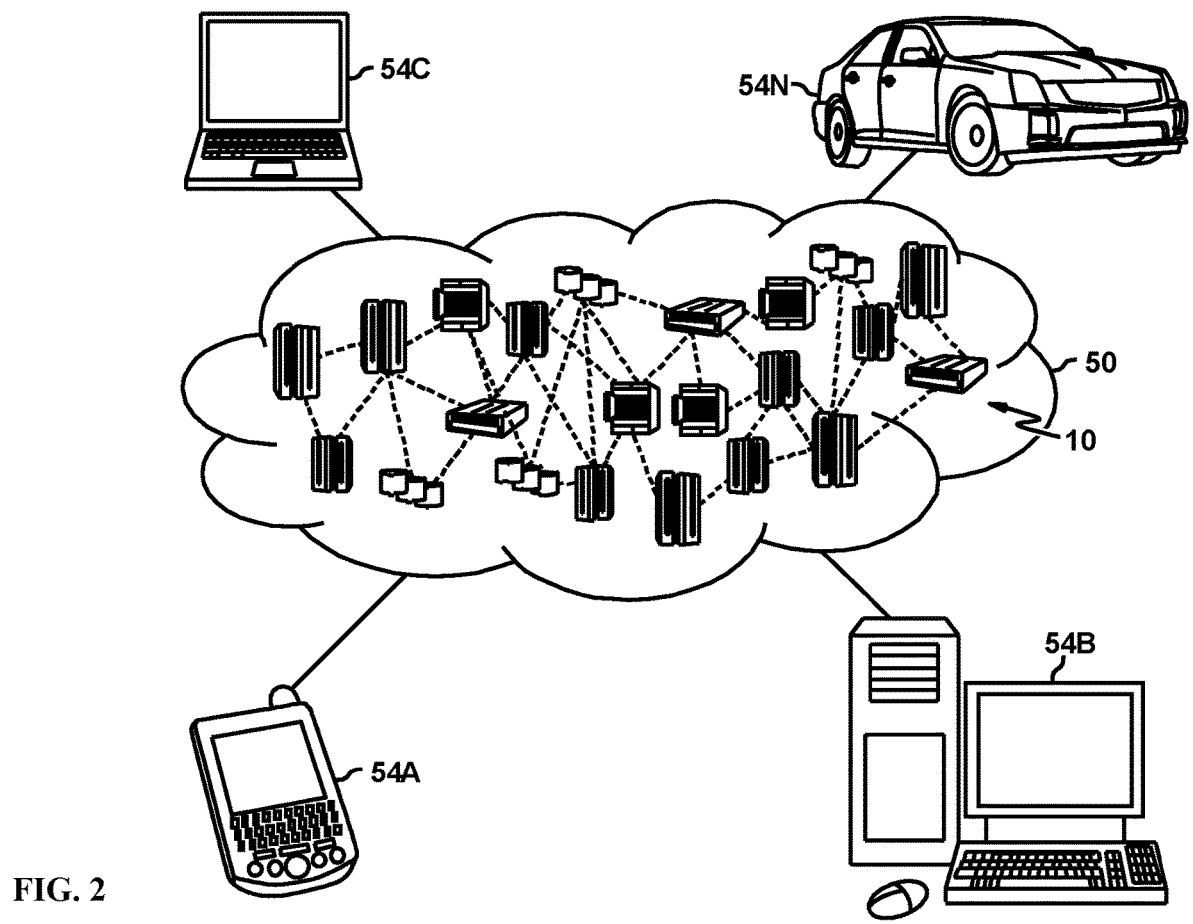
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 3:
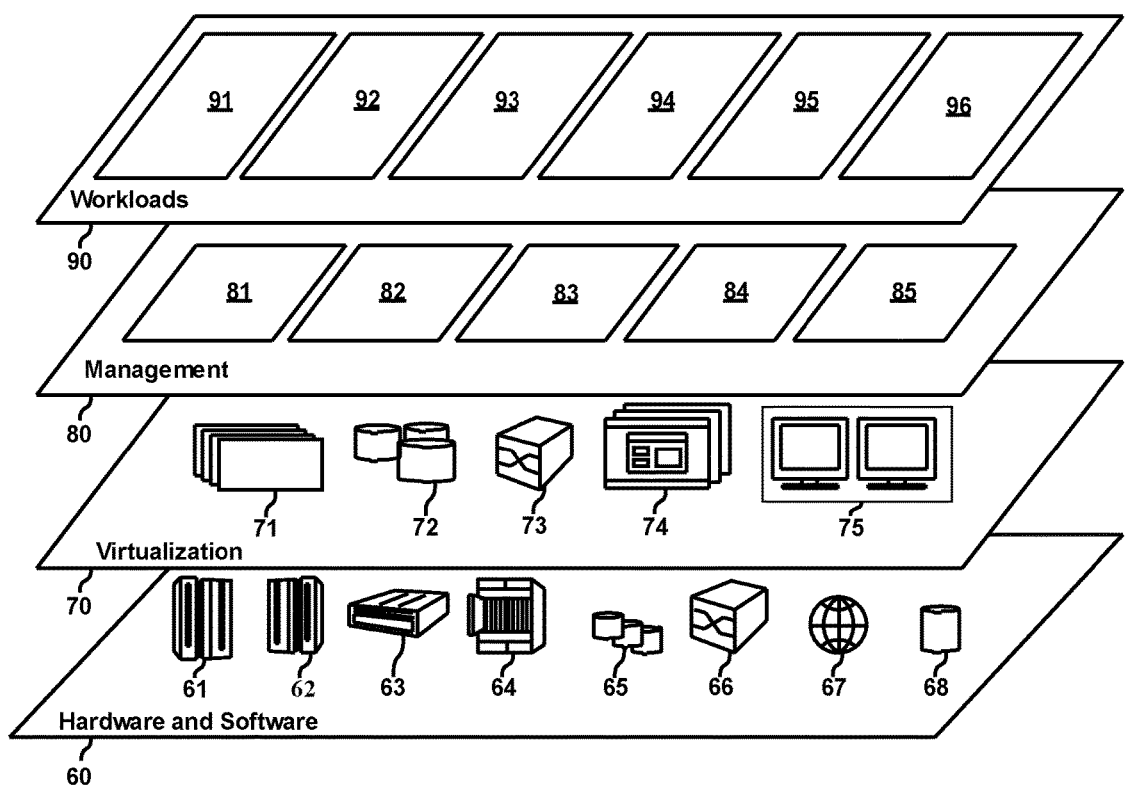
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and an EAVN 96.

Figure 4:
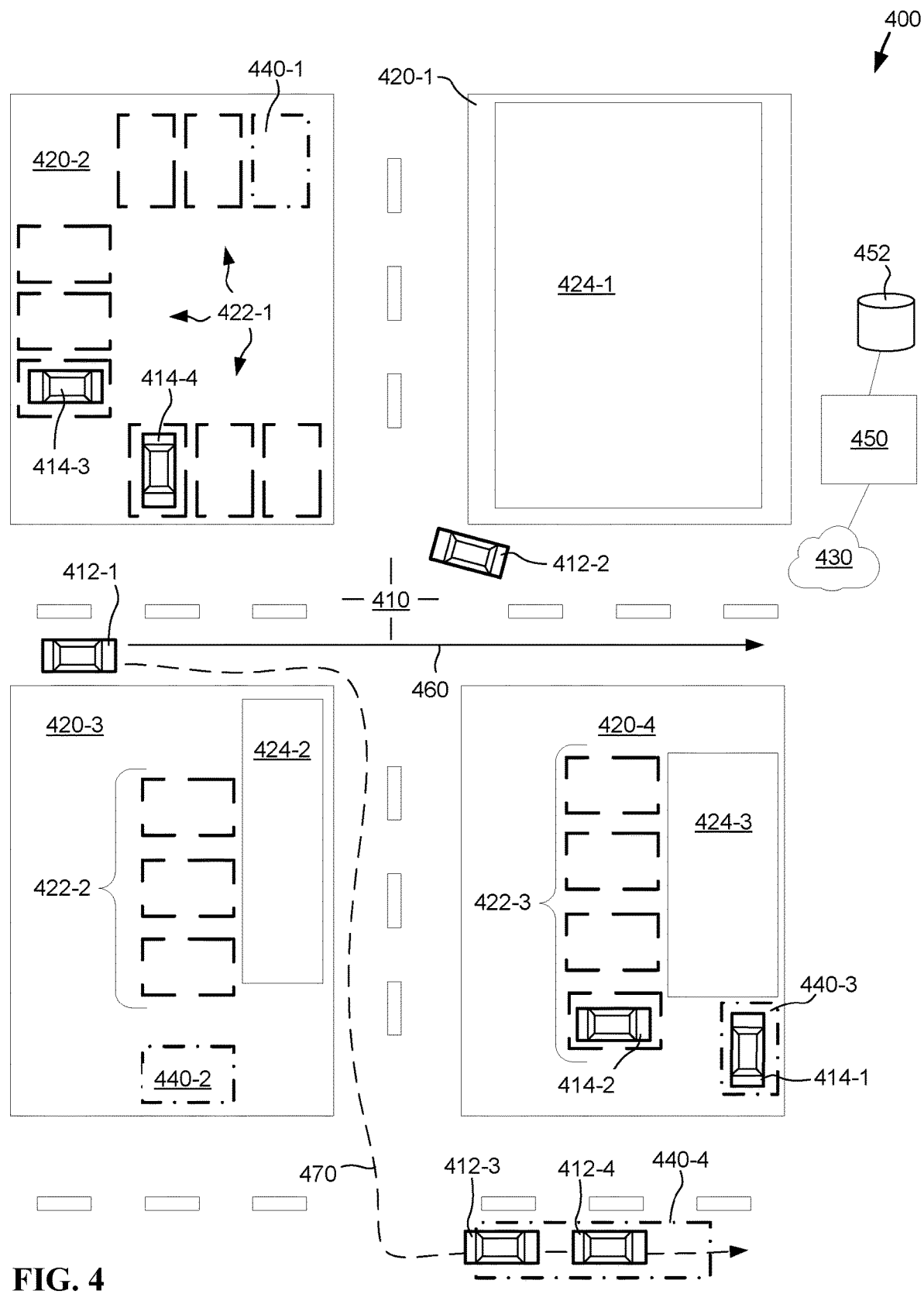
FIG. 4 depicts an example system of vehicle routing and charging based on electricity aware vehicle navigation (EAVN), consistent with some embodiments of the disclosure.

FIG. 4 depicts an example system 400 of vehicle routing and charging based on electricity aware vehicle navigation, consistent with some embodiments of the disclosure. System 400 may include the following: a series of roads 410; a plurality of fixed locations including locations 420-1, 420-2, 420-3, and 420-4 (collectively, locations 420); a network 430; a plurality of electric vehicle charging points 440-1, 440-2, 440-3, and 440-4 (collectively, electric chargers 440) configured to provide charge to electric vehicles; and an EAVN 450 configured to instruct vehicle movement based on traffic congestion and electric charge requirements.

The roads 410 may be configured to permit the driving and operation of one or more vehicles. Specifically, a plurality of moving vehicles 412-1, 412-2, 412-3, and 412-4 (collectively, moving vehicles 412) may be moving on the roads 410. Additional vehicles may be located adjacent to the roads 410. For example, locations 420 may include a plurality of parking spaces and structures for non-moving vehicles 414-1, 414-2, 414-3, and 414-4 (collectively, parked vehicles 414). In detail, location 420-1 may include structure 424-1, a shopping center that includes a plurality of shops of goods and services. Further, location 420-2 may include parking spaces 422-1, and parking infrastructure for shopping center 424-1. Additionally, location 420-3 may be a filling station that includes parking spaces 422-2, and structure 424-2 (a convenience store). Also, location 420-4 may include parking spaces 422-3 and a structure 424-3 (a coffee shop). The parking spaces 422-1, 422-2, 422-3 (collectively, parking spaces 422) may be arranged such that one or more vehicles, including gasoline-power and electric-powered vehicles, may be parked for a certain amount of time.

The network 430 may be one or more networks, such as a wide area network (e.g., the Internet), a plurality of local area networks (e.g., such as wireless networks), one or more Internet of things devices (e.g., beacons and sensors that are configured to monitor the road 410), and other relevant networks and networked devices. The network 430 may facilitate communication between the moving vehicles 412, the non-moving vehicles 414, the electric chargers 440, and the EAVN 450. For example, one or more sensors (not depicted) that are a part of network 430 may transmit information to EAVN 450. In another example, the electric chargers 440 may communicate status to the EAVN 450, such as the availability to accept a vehicle for charging, or a queue of vehicles that are to charge and the start and end times of the charging.

The EAVN 450 may be configured to instruct one or more of the vehicles 412 and 414 regarding movement and charging around the roads 410. Specifically, the EAVN 450 may be a computer, such as computer 100. The EAVN 450 may be a part of a cloud provider, such as cloud provider infrastructure 50. The EAVN 450 may be located adjacent to roads 410. For example, EAVN 450 may be located within a few feet or yards of location 420-1 or another fixed position along road 410. In some embodiments, EAVN 450 may be located distant from roads 410. For example, EAVN 450 may be located at a datacenter or server rack many miles away from roads 410. EAVN 450 may be communicatively coupled to a datastore 452. Datastore 452 may be a database, server, plurality of servers, series of storage devices, and the like. Datastore 452 may store specific vehicle information, such as records of each of the vehicles 412 and 414 and the specific capabilities (e.g., speed, battery recharge rates), and traffic and usage patterns of roads 410. Datastore 452 may store general vehicle information, such as the type of battery, battery replaceability of various models, battery charge and discharge rates of various vehicle models. For example, datastore 452 may contain manufacturer-related specifications and other vehicle information of various model of vehicles that may exist within the region.

The EAVN 450 may include a plurality of circuits and algorithms for measuring the various parameters of the vehicles 412 and 414. Specifically, EAVN 450 may be configured to receive various parameters from vehicles 412 and 414. For example, EAVN 450 may retrieve directly from a given vehicle 412 or 414 information related to the type of vehicle, such as the make, model, trim, vehicle identification number, vehicle license or registration information, or other relevant vehicle information. EAVN 450 may be connected to a datastore 452. Further, EAVN 450 may also receive one or more parameters from datastore 452 regarding the vehicles 412 and 414.

The EAVN 450 may be configured to instruct one or more vehicles that are on and around roads 410 and about potential routes and persistent, existing, and upcoming, scheduled and/or unscheduled use of infrastructure. For examples, moving vehicles 412 and non-moving vehicles 414 may rely on or operate based on a navigation system. Each of the vehicles 412 and 414 may be configured to receive mapping, navigation, parking, and other relevant instructions from a provider (e.g., a mapping provider) and may operate based the received relevant instructions. The EAVN 450 may be configured to intercept the relevant instructions and may alter the operation of the vehicles 412 and 414.

The EAVN 450 may be configured to select parking spaces 422 for one or more of the vehicles 412 and 414. For example, non-moving vehicle 414-2 may be an electric vehicle, that is powered by a battery and is configured to receive an electric charge from a charging point. As depicted in FIG. 4, non-moving vehicle 414-1 may be presently receiving an electric charge from electric charger 440-3. The EAVN 450 may have previously instructed non-moving vehicle 414-2 to park in an available parking space 422-3 that is adjacent or near charger 440-3. The selection by EAVN 450 may be to reduce the amount of movement that electric vehicle 414-2 may need to make to use charger 440-3. In another example, non-moving vehicles 414-3 and 414-4 may be gasoline-powered vehicles. EAVN 450 may have communicated to vehicles 414-3 and 414-4 to park distal from electric charger 440-1. The instruction to vehicles 414-3 and 414-4 may have been based on reducing any congestion near charger 440-1. The instruction to vehicles 414-3 and 414-4 may have been based on facilitating the parking of additional electric vehicles (not depicted) to queue up near charger 440-1. The selection of spaces 422 by EAVN 450 may be based on one or more users of vehicles 412 and 414. For example, a user of electric vehicle 414-2 may have a historical pattern of stopping for a coffee midway along a route after a starting point but before reaching and end point of the route. The EAVN 450 may coordinate with mapping providers to select a parking space 422-3 that is near coffee shop 424-3. The EAVN 450 may select parking space 422-3 based on both a requirement for additional charge for electric vehicle 414-2 and also based on a requirement of a user of electric vehicle 414-2 to stop and get a baked good from coffee shop 424-3. The EAVN 450 may select a parking space 422 to reduce congestion, e.g., to reduce the number of stops or the number of times a given vehicle 412 or 414 may need to traverse road 410.

The EAVN 450 may be configured to update a route of one or more vehicles 412 and 414 based on a plurality of factors. The factors may include information regarding the battery parameters. The battery parameters may include available power, battery discharge rates of various vehicles 412 and 414, locations of various vehicles 412 and 414, required amount of electric charge in a given vehicle 412 or 414 that is required to ensure a vehicle arrives at a an end point, activity level of a user of a given vehicle 412 or 414, the availability of a given electric charger 440, the amount of idle time or break time of a given vehicle 412 or 414, and the like. The factors may include information regarding non-electric vehicles. For example, the EAVN 450 may receive real-time or near real-time data from network 430 regarding the amount of traffic, the number of moving vehicles 412, the number of parked vehicles 414, and other relevant factors to determine one or more routes.

The EAVN 450 may update existing routes of one or more of the vehicles 412 as they move about the environment or vehicles 414 while they are stationary. For example, moving vehicle 412-1 may be an electric vehicle that is on a first route 460. The EAVN 450 may receive a request, e.g., from a vehicle operating system of vehicle 412-1. The request may be based on a need of vehicle 412-1 to get updated guidance and traffic information. The request may be based on a need of vehicle 412-1 to receive a charge, e.g., vehicle 412-1 may currently have a low amount of charge. The request may be based on a normal periodic operating condition of a vehicle 412-1, e.g., vehicle 412-1 may be configured to periodically poll its location and confirm that the route is the quickest route. The EAVN 450 may receive, intercept, or otherwise communicatively detect the request from vehicle 412-1. The EAVN 450 may detect the route 460 along the road 410. The EAVN 450 may identify from one or more battery parameters of vehicle 412-1, that vehicle 412-1 includes inductive capable electric circuitry of receiving a charge while being adjacent to an inductive charger. The EAVN 450 may instruct vehicle 412-1 to change guidance and to travel along route 470.

The EAVN 450 may instruct a given vehicle 412 or 414 to adjust to a different route, despite traffic patterns, congestion, or charging requirements, indicate that by adjusting to as different route the given vehicle 412 or 414 may have to slow down, travel an additional distance, or otherwise increase the duration or length of a route. The EAVN 450 may adjust the movement or parking of the vehicles 412 and/or 414 in a holistic fashion. For example, EAVN 450 may assign longer routes, or longer wait times for some vehicles 412 and/or 414 based on determining that the average or total wait time or distance of the entirety of vehicles 412 and 414 may be reduced. For example, EAVN 450 may instruct vehicle 412-1 to travel on route 470 even though there is considerable traffic, including vehicles 412-3 and 412-4, along route 470. The EAVN 450 may have determined that route 470 includes an inductive charging roadway (i.e., electric charger 440-4) capable of charging electric vehicles while they are in motion below a certain speed. The EAVN 450 may have assigned route 470 based on the knowledge that additional electric vehicles (not depicted) may be assigned to, or may commonly attempt to use other electric charges (e.g., charger 440-1, 440-2) and that if vehicle 412-1 does use charger 440-1 or 440-2, significant wait time may occur for the usage of the additional electric vehicles.

Figure 5:
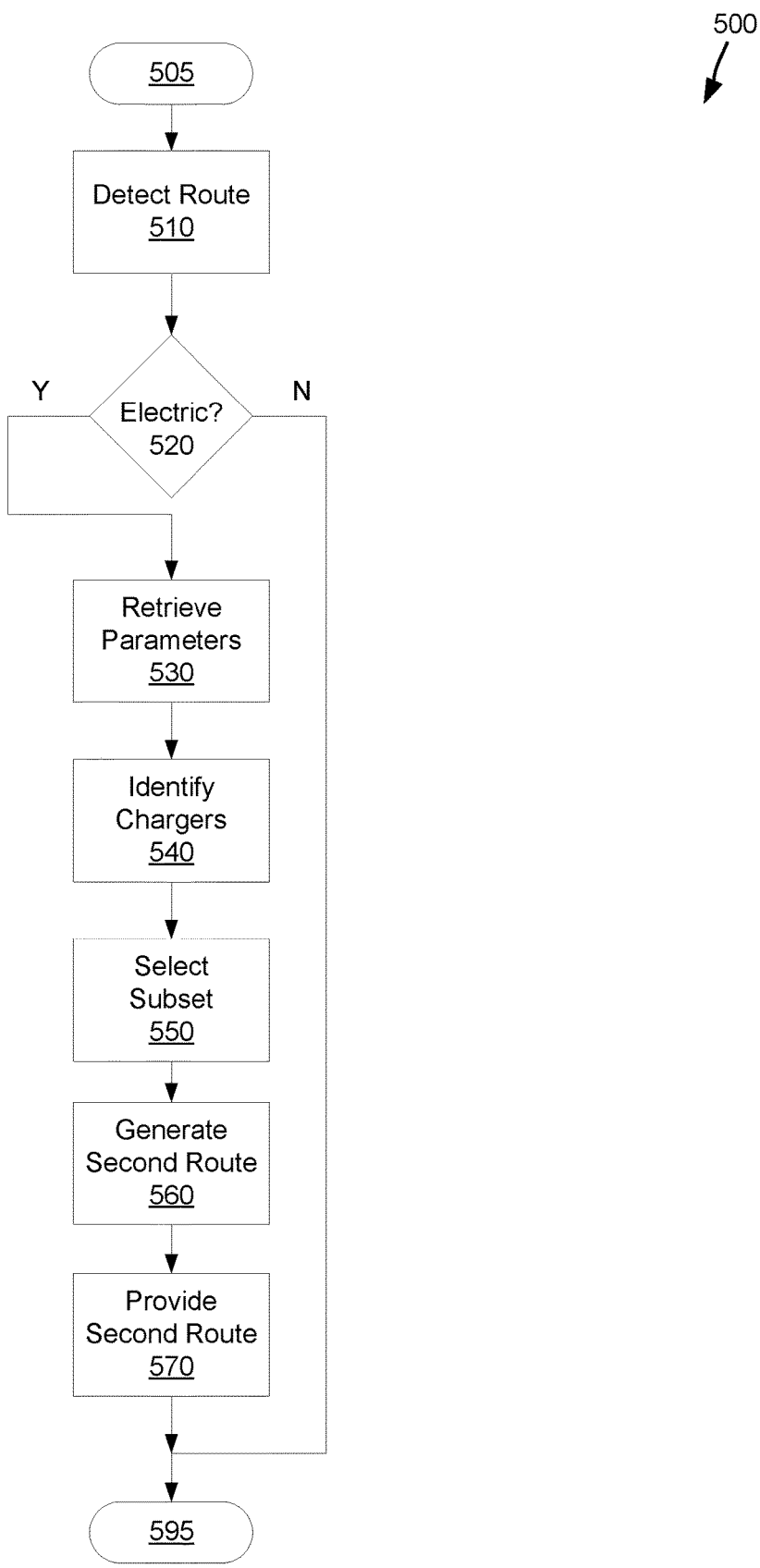
FIG. 5 depicts an example method of performing vehicle routed in concert with assigning vehicle charging, consistent with some embodiments of the disclosure.

FIG. 5 depicts an example method 500 of performing vehicle routed in concert with assigning vehicle charging, consistent with some embodiments of the disclosure. Method 500 may be performed by a computer system, such as computer 100. Method 500 may be performed by a cloud service, such as cloud computing environment 50. Method 500 may be performed by one or more components of an EAVN, such as EAVN 450. Method 500 may be performed periodically, or repeatedly. For example, method 500 may be performed for every electric vehicle in an environment. In some embodiments, method 500 may be performed for only certain electric vehicles. For example, method 500 may be executed responsive to only electric vehicles that are below a certain charging threshold, such as below 75% charge.

Method 500 begins at 505, when a route is detected at 510. The route detection may be in the form of a request-based detections. Specifically, a request may arrive from an electronic vehicle, such as a first car that is powered by an electric battery. Responsive to the request, an EAVN may request additional information, such as the make and model of the requesting vehicle. The route detection may be a part of an existing automotive system, such as a part of a request to make a navigation decision or to navigate to an end point from a start point. The route detection may occur passively from a vehicle point of view. Specifically, a vehicle may be driving down a road and one or more sensors adjacent to the road may detect the heading and orientation of the vehicle. The route detection may be received from a vehicle that is stationary, e.g., a request to navigate from a start point to and end point along with a preferred route. The route detection may be from a vehicle that is already moving, e.g., during movement an autonomous vehicle may send out a status update along with its current route.

Based on the request, it may be determined whether the vehicle is an electric vehicle at 520. For example, the request may include information about the type of vehicle, and an EAVN may cross-reference the type of vehicle with a vehicle database to determine if the vehicle is an electric vehicle. In some embodiments, the determination may be active. For example, an EAVN may receive a request to navigate to an end point, and responsively the EAVN may gate or lock the request to a successful reception of a status (e.g., the type of vehicle).

If the vehicle is an electric vehicle at 520:Y, one or more parameters of the vehicle may be retrieved at 530. The one or more parameters of the vehicle may be retrieved by a request directly to the vehicle. The one or more parameters of the vehicle may be retrieved from a storage. For example, the vehicle that is attempting to traverse a route may have an associated identifier and various information stored in a storage. The storage may be communicatively coupled to an EAVN that is making determinations and processing routing and charging. The retrieved parameters may be one or more route preferences of a user, such as one or more of the following: pattern of travel (e.g., historically does a user or vehicle tend to stop at a third point before reaching a destination), the number and frequency of stops, the type of goods and/or services that a user wishes to procure in the middle of a route, activity of other passengers (e.g., going shopping, visit a park, visit a scenic environment) and the like. The route preferences of the user may be a priority of the user to travel from the start point to the end point. For example, each user that is connected with the EAVN may be assigned a priority based on the type of travel they are performing, such as business, leisure, emergency. The priority may be related to a membership. For example, the EAVN may be provided to users as a membership or social network, and there may be free tiers and paid tiers of membership. The priority may be based on a user being a paid member and having a higher tier of membership (e.g., a paid tier being a higher tier). The retrieved parameters may be related to the battery of the vehicle. The vehicle battery parameters may include one or more of the following: rate of recharging, current available power in the battery of the vehicle, required amount of power (e.g., electric charge) to reach at the destination, compatibility with certain types of charges, ability to charge at various speeds, and the like.

The EAVN may also be configured to identify one or more chargers at 540. The identification of the chargers may be based the location of the chargers. The identification of the chargers may be based on the location or roadways of the route. Specifically, based on a start point (where a vehicle currently is located) and to the endpoint (all the roads that may be able to reach the end point, including the current route that is being driven is or about to be driven by the vehicle). For example, the EAVN may be configured to identify all chargers that are proximate to a first route that is a current route of the vehicle. The EAVN may further identify all chargers on other routes that are able to permit travel of the electric vehicle from the start point to the end point. Depending on the number of chargers that are near a route, identification of the chargers at 540 may include a stepwise continual adjustment of identification. For example, an EAVN may start by identifying chargers that are within a few yards or less of the existing route of the user. The EAVN may be based on a predetermined threshold (e.g., the number of chargers along a route being greater than an average of two chargers every three miles, at least one charger every twenty miles). The EAVN may again perform an identification of the chargers, but may stepwise increase the range of search for chargers. Specifically, the EAVN may perform a search for and identification of chargers by increasing the range by a predetermined amount (e.g., a 5% greater range, a doubling of distance from the route, etc.). Identification of chargers, at 540, may occur without regard to compatibility to an electric vehicle. For example, the EAVN may select all chargers that are within a proximity to the route and may compile a list of those chargers without determining the compatibility of the chargers and the electric vehicle that provided a request for a route.

At 550 a subset of electric chargers may be selected. The subset of chargers may be selected based on parameters of the vehicle. For example, a subset of chargers that are proximate to one or more potential routes may be identified as providing a compatible interface, compatible charging rate, availability for charging, or other relevant metric for selection. Chargers that are not able to charge a vehicle may be discarded or removed from the subset. After the selection, electric vehicle chargers that are technically capable of providing charging to the vehicle may be left in the subset. After the selection, electric vehicle chargers that are technically capable of providing vehicle charging to the vehicle and are available or will be available when the electric vehicle is adjacent may be identified. The subset of chargers may be selected based on parameters of the request. In detail, some vehicle chargers may be proximate to one or more locations, or routes proximate to the one or more locations, that provide goods and services that a particular user may prefer. For example, an EAVN may determine from a user profile of a passenger of the vehicle that the passenger prefers to get a doughnut while traversing from the start point to the end point. The EAVN may select a subset of electric vehicle chargers that are proximate to a bakery that provides donuts or may select an electric vehicle charger that is part of a convenience store that provides donuts.

At 560 a second route may be generated. The second route may be based on the subset of electric vehicle chargers. For example, if it is determined that an electric vehicle is to stop two times before reaching the desired end point of the original route, the EAVN may generate a second route based on the second route having more than one electric vehicle charger. The second route may be generated based on additional vehicles. For example, one or more additional vehicles proximate to one or more of the potential routes may be detected. The additional vehicles may have other requirements such as battery parameters (e.g., a charge that the second vehicle needs to receive from a charger, a compatibility with only certain chargers). The second route may be updated based on the additional vehicles. For example, a second route may be selected that permits a reduced total time of both the first electric vehicle and additional electric vehicles to charge at a plurality of electric chargers that are adjacent to the routes of the vehicles, even if some of the electric chargers may be shared or if the routes may overlap. The second route may be generated based on the end point. For example, an EAVN may determine the current charge of the requesting electric vehicle and may make a determination of the required charge that would ensure that the electric vehicle is capable of reaching the end point. The second route may be generated with a safety margin built into the second route. For example, based on a charge of the electric vehicle, an EAVN may generate a second route that instructs an electric vehicle to charge sufficient to provide enough charge in the battery of the electric vehicle such that the electric vehicle is capable of reaching the end point with an additional twenty percent of battery remaining.

The second route may be generated despite not decreasing the time or distance of the electric vehicle. For example, a first electric vehicle may be only one vehicle and many other vehicles with passengers may also exist and travel proximate to one or more routes that are between the start point and the end point of the first electric vehicle. While a second route may be generated that increases the distance or the time it takes for the first electric vehicle to traverse to the end point, the second route may permit two other electric vehicles to arrive at other destinations more quickly. A second electric vehicle may have a user that always stops at the same electric charger to visit a restaurant and charge. By routing the first electric vehicle on a second route that avoids the restaurant and associated electric charger, the second electric vehicle may not have to wait, and a third electric vehicle may also be able to receive charge in the same time that the first electric vehicle may have taken at the charger near the restaurant.

At 570 the second route may be provided. The second route may be provided by replacing the first route of the electric vehicle with the second route. The second route may be provided by updating or otherwise modifying the first route. After the second route is provided at 570, or if the vehicle is determined not to be an electric vehicle at 520:N, method 500 ends.

Figure 6:
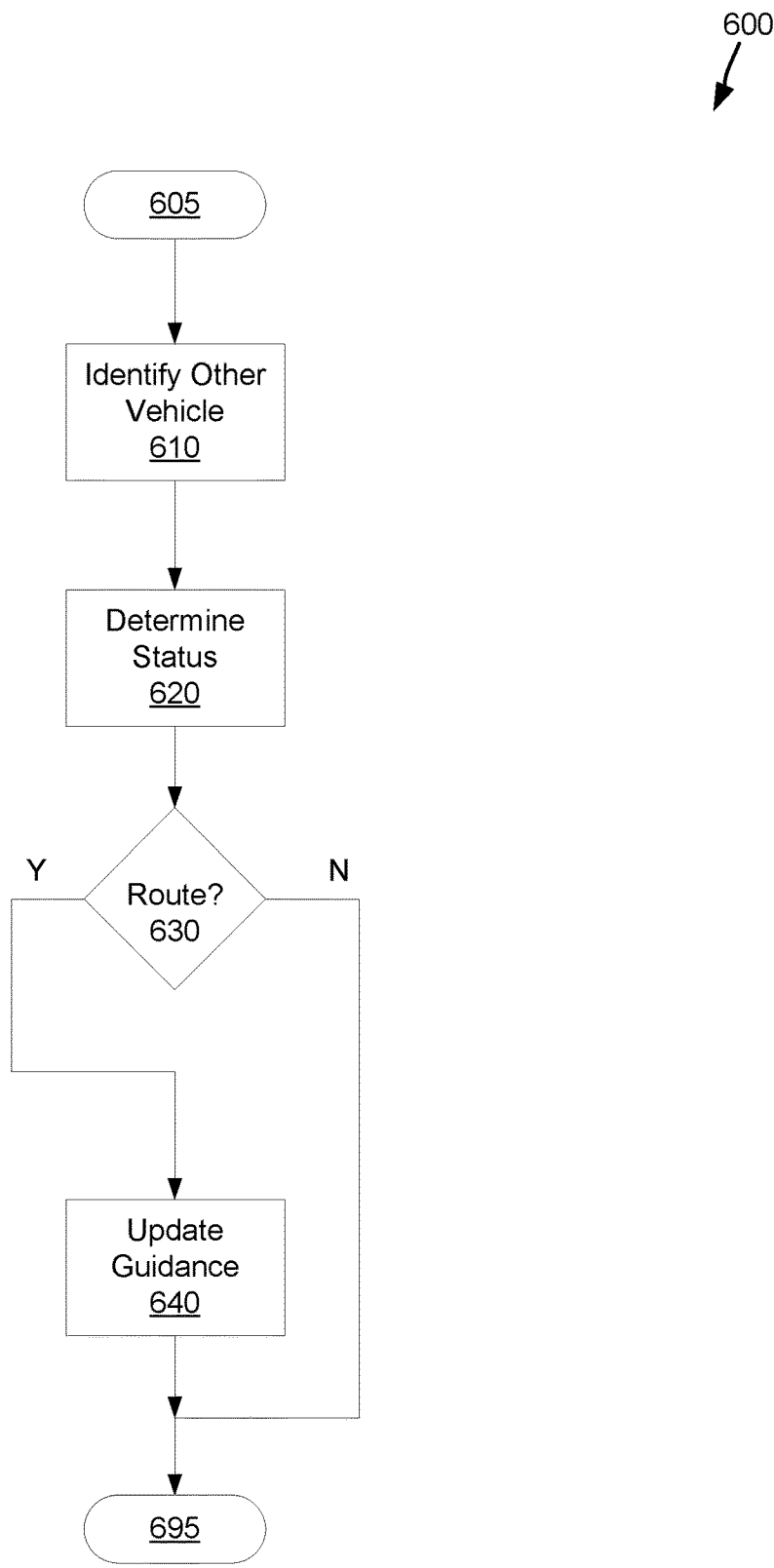
FIG. 6 depicts an example method of instructing a plurality of vehicles operating in a proximity with one or more of the vehicles including an electric powertrain, consistent with some embodiments of the disclosure.

FIG. 6 depicts an example method 600 of instructing a plurality of vehicles operating in a proximity with one or more of the vehicles including an electric powertrain, consistent with some embodiments of the disclosure. Method 600 may be performed by a computer system, such as computer 100. Method 600 may be performed by a cloud service, such as cloud computing environment 50. Method 600 may be performed by one or more components of an EAVN, such as EAVN 450.

Method 600 begins at 605, after a first vehicle has begun driving down a set route. The set route may be an original route that the first vehicle determined outside of an EAVN (e.g., such as through a vehicle guidance system). The set route may be the result of an earlier operation of an EAVN. An EAVN may have previously generated a route that takes into consideration the demands of the vehicle to navigate to an end point and to stop at a first electric charger to receive an additional 10% charge.

Another vehicle may be identified at 610. The other vehicle may be identified directly. For example, the other vehicle may be identified based on a request received from the other vehicle. The other vehicle may be identified indirectly. For example, a second vehicle may submit a routing request to a mapping provider, and the mapping provider may transmit the presence of the routing request to an EAVN. In another example, a second vehicle may not have a present routing or guidance and the second vehicle may submit a search for an electric charger. The search may include communicating with an electric vehicle provider, and the provider may submit information to the second electric vehicle to select a plurality of available electric chargers in a location. The electric vehicle provider may also submit the identity of the second electric vehicle to the EAVN.

At 620 a status of the other electric vehicle may be determined. The determination of the status may be a part of a request that was submitted to a mapping or charging provider. For example, a second electric vehicle may be searching for guidance or charging and may submit its current position. The current position may be passed on to the EAVN. The status may be a location of the second electric vehicle (e.g., its current position on a given road or at a particular address). The status may include a relative position. For example, a status of a second vehicle that may be received, may include a position on a road, a direct of travel, and a velocity of the second vehicle. The EAVN may receive the information and determine a status of the second vehicle that is relative to a charger or a particular route of a first electric vehicle, or one or more other electric vehicles that are being instructed by the EAVN. The status of the other electric vehicles may be determined as presently at or about to be at a particular charger. For example, a second electric vehicle may communicate its status as currently charging at a first electric charger that is adjacent to a museum. In another example, a third electric vehicle may communicate that it has initiated a queuing operation to line up and become next in line to use the first electric charger after the second vehicle is done receiving a charge.

At 630 it may be determined whether the other vehicle status conflicts with the route of the electric vehicle. The determination if there is a conflict at 630, may be based on comparing that one or more roads, lanes, parking spots, chargers, and other parts of the route may be used by one of the other vehicles. For example, it may be determined that a second vehicle is finished receiving charge earlier than expected at a first charger. In another example, it may be determined that a new electric vehicle is now being used by a user in a city center and that the second user is now going to use a given electric charger that was to be used by the first electric vehicle.

If there is a route conflict that is determined at 630:Y, then updated guidance may be issued at 640. The updated guidance may be issued to a first vehicle. For example, if an electric charger is no longer working, the updated guidance may be to instruct the first vehicle that had a route that would include charging at the electric charger to reroute to another charger. The updated guidance may be issued to a plurality of vehicles. For example, a second vehicle may be instructed to move away from a first electric vehicle charger after the second vehicle completes a charge in anticipation of a first electric vehicle using the first charger. The second vehicle may be an autonomous vehicle that is programmed to move or operate based on an instruction from an EAVN. The second vehicle may not be responsive (e.g., the second vehicle has lost communication with the EAVN, the second vehicle is set in a mode to ignore requests to move). Based on not being responsive the updated guidance may be to instruct a first vehicle to reroute to a second electric vehicle charger. In another example, a second vehicle may be instructed to move away from a first vehicle charger. The second vehicle may be instructed to move away for only a short period of time (e.g., forty-five minutes). It may be detected that the second vehicle has moved away from the first vehicle charger, and responsively the first vehicle may be instructed to charge at the first vehicle charger.

After updated guidance has been issued at 640, or if there is no current route conflict detected at 630:N, method 600 may end at 695.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
    detecting, from a first autonomous vehicle of a set of autonomous vehicles, a request to move along a route, the route including a start point and an end point;
    determining that the first autonomous vehicle is an electric vehicle, the electric vehicle including a battery;
    retrieving, in response to the first autonomous vehicle being an electric vehicle, one or more battery parameters of the first autonomous vehicle;
    identifying, based on the start point and the end point, one or more electric vehicle chargers;
    selecting, based on the battery parameters of the first autonomous vehicle, a subset of the electric vehicle chargers;
    generating, based on the subset of the electric vehicle chargers, a second route such that the first autonomous vehicle is capable of reaching the end point;
    modifying, based on the second route, one or more routes of one or more autonomous vehicles of the set of autonomous vehicles;
    replacing the route of the first autonomous vehicle with the second route;
    detecting one or more additional electric vehicles proximate to the second route;
    determining one or more other electric vehicle battery parameters of the one or more additional electric vehicles;
    updating the second route based on the other electric vehicle battery parameters;
    identifying a second autonomous vehicle of the set of autonomous vehicles, the second autonomous vehicle located at a first electric vehicle charger of the subset of electric vehicle chargers;
    determining that the second autonomous vehicle is finished a charge operation at the first electric vehicle charger;
    instructing the second autonomous vehicle to temporarily move away from the first electric vehicle charger for a period of time;
    detecting the second autonomous vehicle is not proximate to the first electric vehicle charger; and
    instructing the first autonomous vehicle to charge at the first electric vehicle charger.

2. The method of claim 1, wherein the method further comprises:
    receiving one or more route preferences from a first passenger; and
    updating, based on one or more route preferences of the first passenger, the second route.

3. The method of claim 2, wherein the first passenger has a route preference of the route preferences that includes a priority for the first autonomous vehicle to travel from the start point to the end point.

4. The method of claim 2, wherein the second route is based on one or more priorities of other passengers, the other passengers of vehicles other than the first autonomous vehicle.

5. The method of claim 2, wherein the first passenger has a route preference to stop at a third point between the start point and the end point.

6. The method of claim 5, wherein:
    the first passenger has a route preference to obtain goods or services at the third point; and
    the selecting the subset further comprises selecting an electric vehicle charger that is proximate to one or more providers that provide the goods or services.

7. The method of claim 5, wherein:
    the first passenger has a route preference to obtain goods or services at the third point; and
    the selecting the subset further comprises selecting an electric vehicle charger that includes a provider of the goods or services.

8. The method of claim 1, wherein the one or more battery parameters are selected from the group consisting of:
    a current range of the first autonomous vehicle,
    a recharge rate of the first autonomous vehicle,
    a recharge compatibility of one or more electric vehicle chargers of the subset of electric vehicle chargers,
    a manner of recharge of the first autonomous vehicle, and
    an age of one or more components of the first autonomous vehicle.

9. The method of claim 1, wherein:
    the updating of the second route is done before the replacing the route of the first autonomous vehicle.

10. The method of claim 1, wherein:
    the generating the second route further comprises comparing a first candidate road to a second candidate road; and
    the first candidate road and the second candidate road lead to the end point.

11. The method of claim 10, wherein the comparison is based on a first discharge rate of the first autonomous vehicle on the first candidate road and a second discharge rate of the first autonomous vehicle on the second candidate road.

12. The method of claim 11, wherein:
    the first discharge rate is based on a speed limit of the first candidate road; and
    the second discharge rate is based on a speed limit of the second candidate road.

13. The method of claim 11, wherein:
    the first discharge rate is based on a road condition of the first candidate road; and
    the second discharge rate is based on a road condition of the second candidate road.

14. The method of claim 11, wherein:
the first discharge rate is based on a traffic condition of the first candidate road; and
the second discharge rate is based on a traffic condition of the second candidate road.

15. A system comprising:
a memory, the memory containing one or more instructions; and
a processor, the processor communicatively coupled to the memory, the processor, in response to reading the one or more instructions, configured for:
  detecting, from a first autonomous vehicle of a set of autonomous vehicles, a request to move along a route, the route including a start point and an end point;
  determining that the first autonomous vehicle is an electric vehicle, the electric vehicle including a battery;
  retrieving, in response to the first autonomous vehicle being an electric vehicle, one or more battery parameters of the first autonomous vehicle;
  identifying, based on the start point and the end point, one or more electric vehicle chargers;
  selecting, based on the battery parameters of the first autonomous vehicle, a subset of the electric vehicle chargers;
  generating, based on the subset of the electric vehicle chargers, a second route such that the first autonomous vehicle is capable of reaching the end point;
  modifying, based on the second route, one or more routes of one or more autonomous vehicles of the set of autonomous vehicles;
  replacing the route of the first autonomous vehicle with the second route;
  identifying a second autonomous vehicle of the set of autonomous vehicles, the second autonomous vehicle located at a first electric vehicle charger of the subset of electric vehicle chargers;
  determining that the second autonomous vehicle is finished a charge operation at the first electric vehicle charger;
  instructing the second autonomous vehicle to temporarily move away from the first electric vehicle charger for a period of time;
  detecting the second autonomous vehicle is not proximate to the first electric vehicle charger; and
  instructing the first autonomous vehicle to charge at the first electric vehicle charger.

16. The system of claim 15, wherein the one or more battery parameters are selected from the group consisting of:
a current range of the first autonomous vehicle,
a recharge rate of the first autonomous vehicle,
a recharge compatibility of one or more electric vehicle chargers of the subset of electric vehicle chargers,
a manner of recharge of the first autonomous vehicle, and
the age of one or more components of the first autonomous vehicle.

17. A computer program product comprising:
one or more computer readable storage media; and
program instructions collectively stored on the one or more computer readable storage media, the program instructions configured for:
  detecting, from a first autonomous vehicle of a set of autonomous vehicles, a request to move along a route, the route including a start point and an end point;
  determining that the first autonomous vehicle is an electric vehicle, the electric vehicle including a battery;
  retrieving, in response to the first autonomous vehicle being an electric vehicle, one or more battery parameters of the first autonomous vehicle;
  identifying, based on the start point and the end point, one or more electric vehicle chargers;
  selecting, based on the battery parameters of the first autonomous vehicle, a subset of the electric vehicle chargers;
  generating, based on the subset of the electric vehicle chargers, a second route such that the first autonomous vehicle is capable of reaching the end point;
  modifying, based on the second route, one or more routes of one or more autonomous vehicles of the set of autonomous vehicles;
  replacing the route of the first autonomous vehicle with the second route;
  detecting one or more additional electric vehicles proximate to the second route;
  determining one or more other electric vehicle battery parameters of the one or more additional electric vehicles;
  updating the second route, based on the other electric vehicle battery parameters identifying a second autonomous vehicle of the set of autonomous vehicles, the second autonomous vehicle located at a first electric vehicle charger of the subset of electric vehicle chargers;
  determining that the second autonomous vehicle is finished a charge operation at the first electric vehicle charger;
  instructing the second autonomous vehicle to temporarily move away from the first electric vehicle charger for a period of time;
  detecting the second autonomous vehicle is not proximate to the first electric vehicle charger; and
  instructing the first autonomous vehicle to charge at the first electric vehicle charger.

18. The computer program product of claim 17, wherein:
the generating of the second route further comprises comparing a first candidate road to a second candidate road; and
the first candidate road and the second candidate road lead to the end point.

* * * * *